US006253180B1

United States Patent
Iso

(10) Patent No.: US 6,253,180 B1
(45) Date of Patent: Jun. 26, 2001

(54) SPEECH RECOGNITION APPARATUS

(75) Inventor: Kenichi Iso, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/335,041

(22) Filed: Jun. 16, 1999

(30) Foreign Application Priority Data

Jun. 19, 1998 (JP) .................................................. 10-173186

(51) Int. Cl.$^7$ ..................................................... G10L 15/06

(52) U.S. Cl. ........................................... 704/244; 704/250

(58) Field of Search ..................................... 704/231, 236, 704/243, 244, 246, 250, 255, 256; 382/155, 159

(56) References Cited

U.S. PATENT DOCUMENTS 5,737,486 * 4/1998 Iso ........................................ 704/232
5,778,340 * 7/1998 Hattori .................................. 704/244

(List continued on next page.)

FOREIGN PATENT DOCUMENTS 4-86899   3/1992 (JP) .
4-293099  10/1992 (JP) .

(List continued on next page.)

OTHER PUBLICATIONS

Ahadi et al., "Rapid speaker adaptation using model prediction," 1995 International Conference in Acoustics, Speech, and Signal Processing, vol. 1, May 1995, pp. 684 to 687.*

Obuchi, Y., Amano, A. & Hataoka, N., "A Novel Speaker Adaptation Algorithm and its Implementation on a RISC Microprocessor", *1997 IEEE Workshop on Automatic Speech Recognition and Understanding Proceedings*, pp. 442–449, 1997.

(List continued on next page.)

*Primary Examiner*—William R. Korzuch
*Assistant Examiner*—Martin Lerner
(74) *Attorney, Agent, or Firm*—McGuire Woods LLP

(57) ABSTRACT

The invention provides a speech recognition apparatus which makes it possible to utilize, upon prior learning, in addition to SD-HMMs of a large number of speakers, adaptation utterances of the speakers to make operation conditions coincide with those upon speaker adaptation to allow prior learning of parameters having a high accuracy and by which, also when the number of words of adaptation utterances upon speaker adaptation is small, adaptation can be performed with a high degree of accuracy. The speech recognition apparatus includes an adaptation utterance storage section for storing adaptation utterances of a new speaker, an SI-HMM storage section for storing speaker independent HMMs, an HMM learning section, a BW-HMM storage section for storing BW-HMMs from the HMM learning section, a subtraction section for outputting finite differences between parameters of the BW-HMMs and the SI-HMMs as first finite differences, a first finite difference storage section, a prediction parameter storage section for storing parameters of a prediction function, a prediction section for predicting second finite differences using the first finite differences and the prediction parameters, a second finite difference storage section, an addition section for adding the second finite differences and the parameters of the SI-HMMs to calculate parameters of the specific speaker HIMs of the new speaker, and an SD-HMM storage section for storing the specific speaker HMMs.

4 Claims, 4 Drawing Sheets

U.S. PATENT DOCUMENTS

| | | | |
|---|---|---|---|
| 5,793,891 | * 8/1998 | Takahashi et al. | 382/228 |
| 5,864,810 | * 1/1999 | Digalakis et al. | 704/255 |
| 6,094,632 | * 7/2000 | Hattori | 704/239 |

FOREIGN PATENT DOCUMENTS

| | | |
|---|---|---|
| 6-67686 | 3/1994 | (JP) . |
| 7-271394 | 10/1995 | (JP) . |
| 9-330095 | 12/1997 | (JP) . |

OTHER PUBLICATIONS

Kosaka, T. & Sayagama, S., "Tree–Structured Speaker Clustering for Fast Speaker Adaptation", *1994 Proceedings of the International Conference on Acoustic, Speech and Signal Processing*, pp. I245–I248, 1994.

Tran, D. & Iso, K., "Predictive Speaker Adaptation and its Prior Training", Sep. 1998.

Gauvain, J. L. & Lee, C. H., "Maximum a Posteriori Estimation for Multivariative Gaussian Mixture Observations of Markov Chains", *IEEE Transactions on Speech and Audio Processing*, vol. 2, pp. 291–298, Apr. 1994.

Ohkura, K., Ohnishi, H. & Iida, M., "Speaker Adaptation Based on Transfer Vectors of Multiple Reference Speakers", *The Transactions of the Institute of Electronics, Information and Communication Engineers*, vol. J79, No. 5, pp. 667–674, May 1996.

Takahashi, S. & Sagayama, S., "Tied Structure for Acoustic Models Based on Vector Field Correlations", Sep. 1995.

"Speaker Adaptation Which Makes Use of Prior Knowledge Regarding Correlation of Movement Vectors", the Collection of Lecture Papers of the Autumn Meeting for Reading Research Papers in 1997, the Acoustic Society of Japan, Sep. 1997.

* cited by examiner

SPEECH RECOGNITION APPARATUS

BACKGROUND OF THE INVENTION

1. Field of the Invention

The present invention relates to a speech recognition apparatus, and more particularly to a speech recognition apparatus which has an improved speaker adaptation function.

2. Description of the Related Art

As a conventional speaker adaptation system, a thesis entitled "Speaker Adaptation Which Makes Use of Prior Knowledge Regarding Correlation of Movement Vectors" in the Collection of Lecture Papers of the Autumn Meeting for Reading Research Papers in 1997, the Acoustic Society of Japan, Separate Volume I, pp. 23–24, September, 1997 is referred to.

FIG. 3 shows a speech adaptation system of a conventional speech recognition apparatus based on a hidden Markov model (HMM), and FIG. 4 shows a prior learning system of the conventional speech recognition apparatus of FIG. 3.

Referring to FIGS. 3 and 4, upon speaker adaptation, learning is performed by an HMM learning section 33 using adaptation utterances of a new speaker stored in an adaptation utterance storage section 31 and using speaker independent HMMs (hereinafter referred to as "SI-HMMs") stored in an SI-HMM storage section 32 in advance as initial models, and HMMs (hereinafter referred to as "BW-HMMs") obtained as a result of the learning are stored into a BW-HMM storage section 34.

A subtraction section 35 stores finite differences between parameters of the BW-HMM and the SI-HMM into a first finite difference storage section 36. Into the first finite difference storage section 36, only parameter finite differences of those HMMs which appear in the adaptation utterances. For example, if the adaptation utterances include three utterances of "a", "u" and "o", since a parameter of the HMM corresponding to the "a" and parameters of the HMMs corresponding to "u" and "o" are learned by the HMM learning section 33, finite differences between BW-HMMs and SI-HMMs for them are produced.

However, since "i" and "e" do not appear in the adaptation utterances, corresponding HMMs are not learned either, and parameters of the BW-HMMs remain same as the parameters of the SI-HMMs, the finite differences remain equal to 0.

An interpolation parameter storage section 37 stores interpolation parameters determined in prior learning (which will be hereinafter described).

An interpolation section 38 outputs second finite differences as linear sums of the interpolation parameters and the finite differences stored in the first finite difference storage section 36 so that the second finite differences may be stored into a second finite difference storage section 39.

The second finite differences calculated by the interpolation section 38 are finite differences between parameters of those HMMs which have not appeared in the adaptation utterances and parameter of the SI-HMMs.

In the example described above, finite differences regarding the HMMs of "i" and "e" are calculated as second finite differences.

A re-estimation parameter storage section 41 stores re-estimation parameters determined in prior learning which will be hereinafter described.

A re-estimation section 40 receives the re-estimation parameters and the first and second finite differences as inputs thereto, calculates third finite differences for all HMM parameters, and stores the third finite differences into a third finite difference storage section 42. In the example described above, the third finite differences are finite differences for parameters of all of the HMMs of "a", "i", "u", "e" and "o".

An addition section 43 adds the parameters of the SI-HMM and the third finite differences to determine specific speaker HMMs adapted to the new speaker and stores the specific speaker HMMs into an SD-HMM storage section 44.

Upon prior learning, specific speaker HMMs (SD-HMMs) of a large number of speakers are stored into the SD-HMM storage section 44, and finite differences (referred to as "third finite differences") between the parameters of the SD-HMMs of the individual speakers and the parameters of the SI-HMMs calculated by the subtraction section 47 are stored into the third finite difference storage section 42. Of the third finite differences, those third finite differences for the parameters of the HMMs which appeared in the adaptation utterances upon speaker adaptation are represented by "S", and the other third finite differences (those for the parameters of the HMMs which did not appear in the adaptation utterances) are referred to as "U".

An interpolation parameter learning section 45 determines the interpolation parameters so that the square sum of errors, which are differences U–U1 between linear sums (referred to as "U1") of the third finite differences S and the interpolation parameters and the third finite differences U, for the large number of speakers may be minimum, and stores the determined interpolation parameters into the interpolation parameter storage section 37.

Then, the linear sums of the determined interpolation parameters and the third finite differences S are outputted as second finite differences so that they are stored into the second finite difference storage section 39.

A re-estimation parameter learning section 46 determines the re-estimation parameters so that the square sum of errors, which are differences U–U3 between linear sums (referred to as "U3") of the second finite differences and the re-estimation parameter and the third finite differences U, for the large number of speakers may be minimum, and stores the re-estimation parameters into the re-estimation parameter storage section 41.

The conventional speech recognition apparatus described above, however, has the following problems.

The first problem resides in that, upon speaker adaptation, interpolation and re-estimation are performed using finite differences (first finite differences) between BW-HMMs produced using adaptation utterances of a new speaker stored in the adaptation utterance storage section and SI-HMMs, but in prior learning for determination of interpolation parameters and re-estimation parameters, only SD-HMMs of a large number of speakers are used to perform learning.

In particular, in prior learning, first finite differences which are used upon speaker adaptation are not used, but third finite differences are used in substitution. Where the number of words of adaptation utterances is sufficiently large, since the SD-HMMs and the BW-HMMs substantially coincide with each other, this substitution is good approximation.

However, in speaker adaptation, it is the most significant subject to minimize the number of words of adaptation utterances. This reduces the burden to utterances of the user.

Where the number of words of adaptation utterances is small, since parameters of the SD-HMMs and the BW-HMMs are significantly different from each other, the approximation accuracy in such substitution as described above upon prior learning (that is, substitution of the first finite differences by the third finite differences) is very low, and it is difficult to estimate interpolation parameters or re-estimation parameters with a high degree of accuracy.

The second problem resides in that, in order to perform speaker adaptation, two linear transforms of interpolation and re-estimation are performed using a single finite difference (stored in the first finite difference storage section).

Where the number of words of adaptation utterances is small, the ratio of HMMs appearing in the utterances is very small. Therefore, it is inevitable to estimate (finite differences of) parameters of the greater part of HMMs by linear interpolation, particularly by linear transform of (finite differences of) parameters of a small number of HMMs which actually appear, and consequently, the accuracy of the second finite difference is very low.

Further, also parameters of those HMMs which have appeared in adaptation utterances are modified by re-estimation using finite differences (second finite differences having a low accuracy) of parameters of a large number of HMMs which have not appeared. Therefore, also the parameters of HMMs which have appeared in the adaptation utterances are deteriorated.

SUMMARY OF THE INVENTION

It is an object of the present invention to provide a speech recognition apparatus which makes it possible to utilize, upon prior learning, in addition to SD-HMMs of a large number of speakers, adaptation utterances of the speakers to make operation conditions coincide with those upon speaker adaptation to allow prior learning of parameters having a high accuracy.

It is another object of the present invention to provide a speech recognition apparatus by which, particularly when the number of words of adaptation utterances upon speaker adaptation is small, all of parameters of HMMs can be adapted with a high degree of accuracy by single time prediction (linear transform).

In order to attain the object described above, according to an aspect of the present invention, there is provided a speech recognition apparatus, comprising an adaptation utterance storage section for storing adaptation utterances of a new speaker, a speaker independent hidden Markov model storage section for storing speaker independent hidden Markov models prepared in advance, a hidden Markov model learning section for performing hidden Markov model learning using the adaptation utterances and the speaker independent hidden Markov models, a learned hidden Markov model storage section for storing learned hidden Markov models obtained as an output of the hidden Markov model learning section, a subtraction section for calculating finite differences between parameters of the learned hidden Markov models and parameters of the speaker independent hidden Markov models and outputting the calculated differences as first finite differences, a first finite difference storage section for storing the first finite differences, a prediction parameter storage section for storing parameters of a prediction function, a prediction section for predicting second finite differences using the first finite differences and the prediction parameters, a second finite difference storage section for storing the second finite differences outputted from the prediction section, an addition section for adding the second finite differences and the parameters of the speaker independent hidden Markov models to calculate parameters of the specific speaker hidden Markov models of the new speaker, and a specific speaker hidden Markov model storage section for storing the specific speaker hidden Markov models of the new speaker outputted from the addition section.

Preferably, the speech recognition apparatus is constructed such that, when prior learning for determining the prediction parameters is to be performed, the adaptation utterances of the large number of speakers are stored into the adaptation utterance storage section and the specific speaker hidden Markov models of the large number of speakers prepared in advance are stored into the specific speaker hidden Markov model storage section, and the hidden Markov model learning section produces learned hidden Markov models of the individual speakers using the adaptation utterances of the large number of speakers stored in the adaptation utterance storage section and stores the produced learned hidden Markov models into the learned hidden Markov model storage section, whereafter the subtraction section calculates finite differences between the parameters of the learned hidden Markov models of the speakers stored in the learned hidden Markov model storage section and the parameters of the speaker independent hidden Markov models stored in the speaker independent hidden Markov model storage section and stores the calculated finite differences as first finite differences of the speakers into the first finite difference storage section, and wherein the speech recognition apparatus further comprises a second subtraction section for calculating finite differences between the parameters of the specific speaker hidden Markov models of the large number of speakers and the parameters of the speaker independent hidden Markov models as second finite differences, an output of the second subtraction section being stored into the second finite difference storage section, and a prediction parameter learning section for learning prediction parameters using the first finite differences and the second finite differences of the speakers, the prediction parameters which are outputted from the prediction parameter learning section being stored into the prediction parameter storage section.

According to another aspect of the present invention, there is provided a speech recognition apparatus, comprising means for performing hidden Markov model learning from adaptation utterances of a new speaker stored in storage means in advance and speaker independent hidden Markov models, means for calculating finite differences between parameters of learned hidden Markov models obtained as a result of the hidden Markov model learning and parameters of the speaker independent hidden Markov models, means for storing the calculated finite differences as first finite differences, a prediction parameter storage section for storing parameters of a prediction function determined in advance by prior learning, prediction means for predicting second finite differences from linear sums of the first finite differences and the prediction parameters, a specific speaker hidden Markov model storage section for storing specific person hidden Markov models of the new speaker, and addition means for adding the second finite differences and the parameters of the speaker independent hidden Markov models to calculate the parameters of the specific speaker hidden Markov models of the new speaker and outputting the parameters of the specific speaker hidden Markov models of the new speaker to the specific speaker hidden Markov model storage section.

Preferably, the speech recognition apparatus is constructed such that, in prior learning, the prediction parameters are learned using specific speaker hidden Markov models of a large number of speakers stored in the specific speaker hidden Markov model storage section and adaptation utterances of the speakers.

The speech recognition apparatus described above are advantageous in that adaptation is completed by a single linear transform (prediction) in speaker adaptation while a conventional speech recognition apparatus requires two linear transforms of interpolation and re-estimation.

The speech recognition apparatus are advantageous also in that, in prior learning, adaptation utterances of a large number of speakers can be utilized, and optimum prediction parameters can be determined by a construction similar to that for speaker adaptation. Consequently, non-linearity between prior learning and speaker adaptation can be eliminated. Further, even where only a small amount of adaptation utterance is available, stable speaker adaptation of a high degree of stability can be realized.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
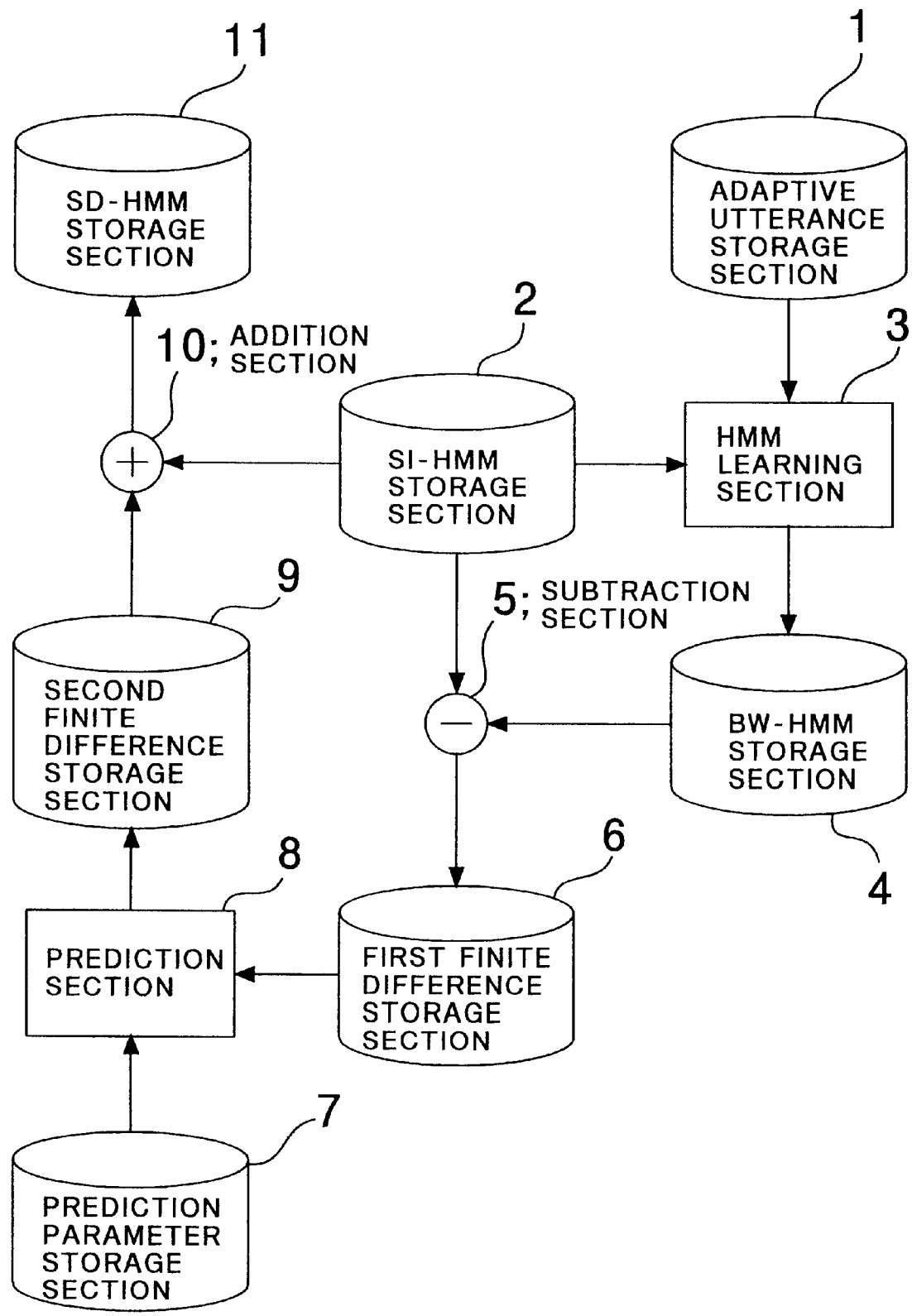
FIG. 1 is a block diagram showing a speaker adaptation function section of a speech recognition apparatus to which the present invention is applied.
Figure 3:
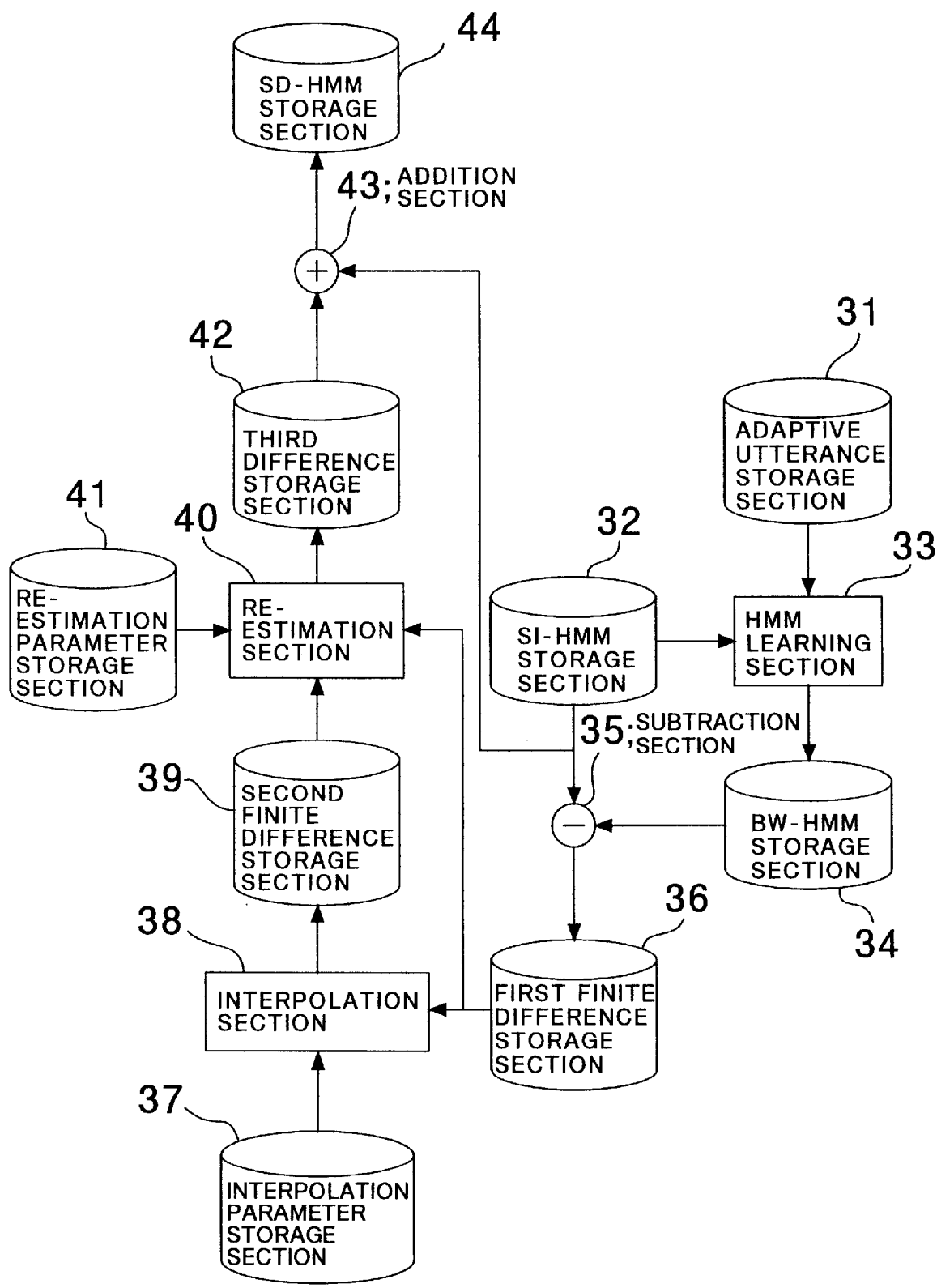
FIG. 3 is a block diagram showing a speech adaptation function section of a conventional speech recognition apparatus.

Referring first to FIG. 1, there is shown a speech recognition apparatus according to the present invention. The speech recognition apparatus is an improvement to the conventional speech recognition apparatus described hereinabove with reference to FIG. 3 and includes, in place of the interpolation section 38, interpolation parameter storage section 37, re-estimation section 40, re-estimation parameter storage section 41 and third finite difference storage section 42 of the speaker adaptation function section of the apparatus of FIG. 3, a prediction section and a prediction parameter storage section. The construction allows unification of two linear transforms of interpolation and re-estimation required in the conventional speech adaptation into a single linear transform of prediction to allow speaker adaptation of a high degree of accuracy.

More particularly, the speech recognition apparatus includes an adaptation utterance storage section 1 for storing adaptation utterances of a new speaker, an SI-HMM storage section 2 for storing speaker independent HMMs prepared in advance, an HMM learning section 3 for performing HMM learning using the adaptation utterances and the speaker independent HMMs, a BW-HMM storage section 4 for storing BW-HMMs obtained as an output of the HMM learning section 3, a subtraction section 5 for calculating finite differences between parameters of the BW-HMMs and parameters of the SI-HMMs and outputting the calculated differences as first finite differences, a first finite difference storage section 6 for storing the first finite differences, a prediction parameter storage section 7 for storing parameters of a prediction function, a prediction section 8 for predicting second finite differences using the first finite differences and the prediction parameters, a second finite difference storage section 9 for storing the second finite differences outputted from the prediction section 8, an addition section 10 for adding the second finite differences and the parameters of the SI-HMMs to calculate parameters of the specific speaker HMMs of the new speaker, and an SD-HMM storage section 11 for storing the specific speaker HMMs of the new speaker which are an output of the addition section 10.

Figure 4:
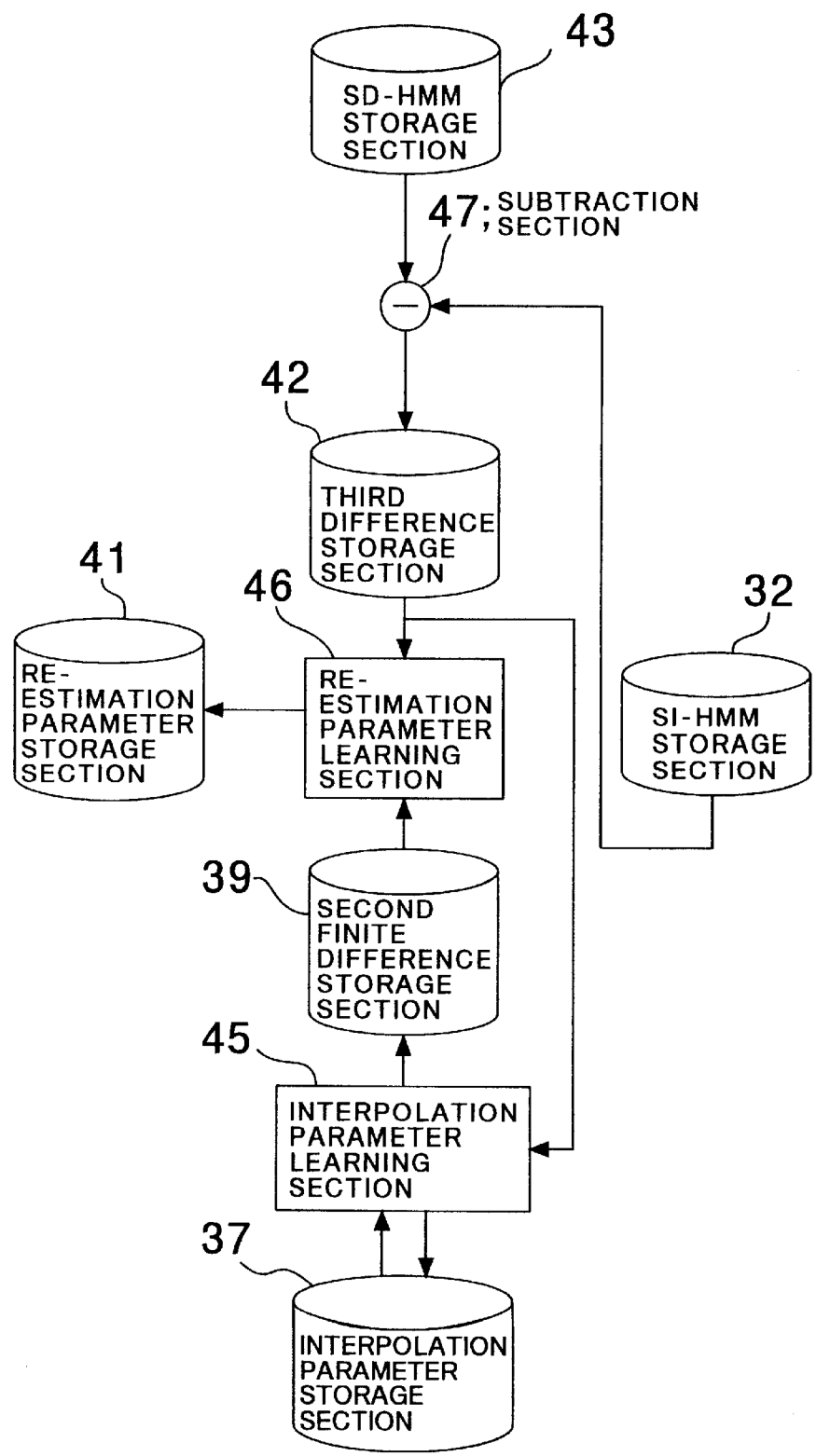
FIG. 4 is a block diagram showing a prior learning function section of the conventional speech recognition apparatus of FIG. 3.

Further, the speech recognition apparatus does not perform prior learning non-symmetrical to that upon speaker adaptation like prior learning in the conventional apparatus described hereinabove with reference to FIG. 4, but implements a prior learning function which operates in the same conditions as those upon speaker adaptation by making use of those components which provide the speaker adaptation function as it is and adding a prediction parameter learning section a second subtraction section in place of the prediction section and the addition section, respectively.

Figure 2:
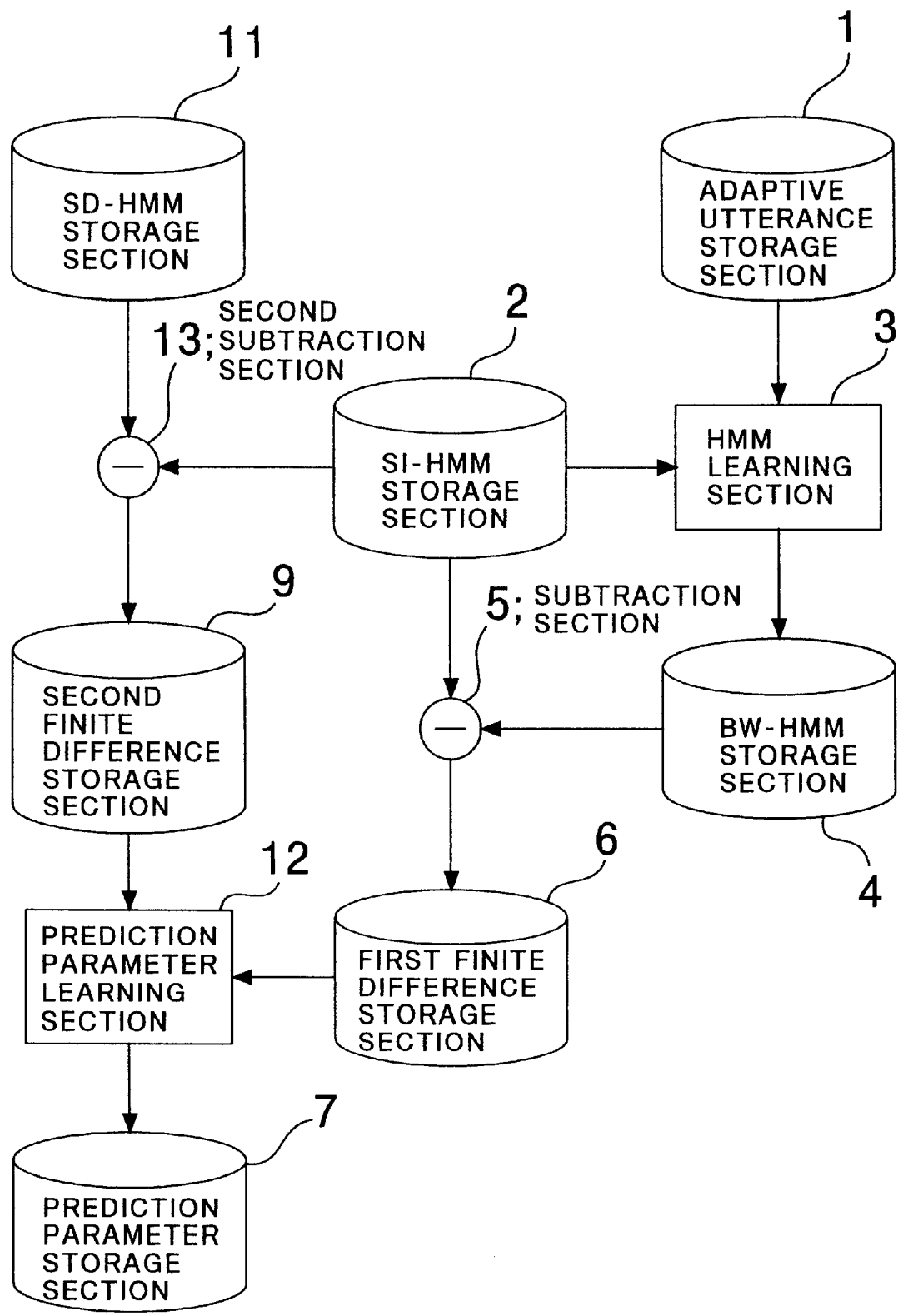
FIG. 2 is a block diagram showing a prior learning function section of the speech recognition apparatus of FIG. 1.

Referring to FIG. 2, when the speech recognition apparatus performs prior learning for determining prediction parameters, adaptation utterances of a large number of speakers are stored into the adaptation utterance storage section 1, and specific speaker HMMs of the large number of speakers prepared in advance are stored into the SD-HMM storage section 11. Then, the HMM learning section 3 produces BW-HMMs of the individual speakers using the adaptation utterances of the large number of speakers stored in the adaptation utterance storage section 1 and stores them into the BW-HMM storage section 4. The subtraction section 5 calculates finite differences between parameters of the BW-HMMs of the speakers stored in the BW-HMM storage section 4 and parameters of the SI-HMMs stored in the SI-HMM storage section 2 and stores them as first finite differences of the speakers into the first finite difference storage section 6. A second subtraction section 13 calculates finite differences between the parameters of the specific speaker HMMs of the large number of speakers and the parameters of the SI-HMMs as second finite differences, and an output of the second subtraction section 13 is stored into the second finite difference storage section 9. A prediction parameter learning section 12 learns prediction parameters using the first finite differences and the second finite differences of the speakers. The prediction parameters outputted from the prediction parameter learning section 12 are stored into the prediction parameter storage section 7.

Since the speech recognition apparatus is constructed in such a manner as described above, upon prior learning, utilization of adaptation utterances of a large number of speakers is allowed in addition to SD-HMMs of the speakers, and prior learning of parameters of a high degree of accuracy is allowed using same operation conditions as those upon speaker adaptation and adaptation with a high degree of accuracy can be realized even where a small number of adaptation utterances are used.

The speech recognition apparatus according to the present invention is described in more detail.

Referring first to FIG. 1 which shows the speaker adaptation function section of the speech recognition apparatus, the adaptation utterance storage section 1 stores adaptation utterances of a new speaker. The SI-HMM storage section 2 stores speaker independent HMMs (hereinafter referred to as "SI-HMMs") prepared in advance.

The HMM learning section 3 performs HMM learning based on the adaptation utterances using the SI-HMMs as initial models and outputs HMMs after the learning (hereinafter referred to as "BW-HMMs"). The BW-HMM storage section 4 stores the BW-HMMs outputted from the HMM learning section 3.

The subtraction section 5 calculates finite differences between parameters of the SI-HMMs such as, for example, average vectors of a Gaussian distribution and parameters of the BW-HMMs and outputs the finite differences as first finite differences. The first finite difference storage section 6 stores the first finite differences outputted from the subtraction section 5.

The prediction parameter storage section 7 stores prediction parameters determined by prior learning in advance.

The prediction section 8 calculates linear sums of the first finite differences and the prediction parameters and outputs the linear sums as second finite differences. The second finite difference storage section 9 stores the second finite differences outputted from the prediction section 8.

The addition section 10 adds the second finite differences and the parameters of the SI-HMMs and outputs the sum values as specific speaker HMMs with which the speaker adaptation of the new speaker has been completed. The SD-HMM storage section 11 stores the specific speaker HMMs outputted from the addition section 10. The specific speaker HMMs stored in the SD-HMM storage section 11 are HMMs for the new speaker obtained by speaker adaptation with a small amount of adaptation utterance of the new speaker.

The accuracy of speaker adaptation depends upon the prediction parameters. In prior learning, the prediction parameters are estimated (learned) optimally using specific speaker HMMs (hereinafter referred to as "SD-HMMs") of a large number of speakers and adaptation utterances of the speakers.

An SD-HMM of each speaker is obtained by HMM learning using a large amount of utterance of the speaker. To prepare pairs (sets) of an SD-HMM and an adaptation utterance of the speaker corresponds to prepare a large number of pairs of an input (stored in the adaptation utterance storage section 1) in the speaker adaptation in FIG. 1 and a desirable output (stored in the SD-HMM storage section 11) to be obtained as a result of the adaptation.

Prior learning by which prediction parameters are determined optimally when a large number of examples of a desirable output with respect to an input are obtained is described with reference to FIG. 2.

Referring to FIG. 2, the construction of the speech recognition apparatus is different from that of FIG. 1 only in the prediction parameter learning section 12 and the second subtraction section 13. In particular, the prediction section 8 shown in FIG. 1 is replaced by the prediction parameter learning section 12, and the addition section 10 is replaced by the second subtraction section 13.

First, adaptation utterances of a large number of speakers are stored into the adaptation utterance storage section 1. Further, SD-HMMs of the large number of speakers are stored into the SD-HMM storage section 11.

The HMM learning section 3 produces BW-HMMs of the speakers using the SI-HMMs and the adaptation utterances of the speakers in a similar manner as upon speaker adaptation and stores the produced BW-HMMs into the BW-HMM storage section 4.

The subtraction section 5 calculates finite differences between parameters of the BW-HMMs of the individual speakers and parameters of the SI-HMMs and outputs them as first finite differences. The first finite difference storage section 6 stores the first finite differences outputted from the subtraction section 5.

The second subtraction section 13 reads out the SD-HMMs of the individual speakers stored in the SD-HMM storage section 11 and calculates finite differences between the read out parameters of the SD-HMMs and the parameters of the SI-HMMs, and then outputs the calculated finite differences as second finite differences. The second finite difference storage section 9 stores the second finite differences outputted from the second subtraction section 13.

The prediction parameter learning section 12 calculates linear sums of the first finite differences and the prediction parameters and determines the values of the prediction parameters so that the square sum of errors, which are differences between the linear sums and the second finite differences, for all of the speakers maybe minimum. The output value of the prediction section 8 when a first finite difference is inputted to the prediction section 8 is a second finite difference.

The prediction parameter learning section 12 estimates prediction parameters, for the large number of speakers, from the examples of the first finite differences to be inputted to the prediction section 8 and the second finite differences which are desirable output values of the prediction section 8 with respect to the inputs to the prediction section 8. The prediction parameter storage section 7 stores the prediction parameters determined by the prediction parameter learning section 12.

By the procedure described above, in prior learning, an optimum prediction parameter can be learned (estimated) using a quite similar mechanism to that used upon speaker adaptation.

While a preferred embodiment of the present invention has been described using specific terms, such description is for illustrative purpose only, and it is to be understood that changes and variations may be made without departing from the spirit or scope of the following claims.

What is claimed is:

1. A speech recognition apparatus, comprising:
   an adaptation utterance storage section for storing adaptation utterances of a new speaker;
   a speaker independent hidden Markov model storage section for storing speaker independent hidden Markov models prepared in advance;
   a hidden Markov model learning section for performing hidden Markov model learning using the adaptation utterances and the speaker independent hidden Markov models;
   a learned hidden Markov model storage section for storing learned hidden Markov models obtained as an output of said hidden Markov model learning section;
   a subtraction section for calculating finite differences between parameters of the learned hidden Markov models and parameters of the speaker independent hidden Markov models and outputting the calculated differences as first finite differences;
   a first finite difference storage section for storing the first finite differences;

a prediction parameter storage section for storing parameters of a prediction function;

a prediction section for predicting second finite differences using the first finite differences and the prediction parameters;

a second finite difference storage section for storing the second finite differences outputted from said prediction section;

an addition section for adding the second finite differences and the parameters of the speaker independent hidden Markov models to calculate parameters of the specific speaker hidden Markov models of the new speaker, and a specific speaker hidden Markov model storage section for storing the specific speaker hidden Markov models of the new speaker outputted from said addition section.

2. A speech recognition apparatus as claimed in claim 1, wherein, when prior learning for determining the prediction parameters is to be performed, the adaptation utterances of the large number of speakers are stored into said adaptation utterance storage section and the specific speaker hidden Markov models of the large number of speakers prepared in advance are stored into said specific speaker hidden Markov model storage section, and said hidden Markov model learning section produces learned hidden Markov models of the individual speakers using the adaptation utterances of the large number of speakers stored in said adaptation utterance storage section and stores the produced learned hidden Markov models into said learned hidden Markov model storage section, whereafter said subtraction section calculates finite differences between the parameters of the learned hidden Markov models of the speakers stored in said learned hidden Markov model storage section and the parameters of the speaker independent hidden Markov models stored in said speaker independent hidden Markov model storage section and stores the calculated finite differences as first finite differences of the speakers into said first finite difference storage section, and wherein said speech recognition apparatus further comprises a second subtraction section for calculating finite differences between the parameters of the specific speaker hidden Markov models of the large number of speakers and the parameters of the speaker independent hidden Markov models as second finite differences, an output of said second subtraction section being stored into said second finite difference storage section, and a prediction parameter learning section for learning prediction parameters using the first finite differences and the second finite differences of the speakers, the prediction parameters which are outputted from said prediction parameter learning section being stored into said prediction parameter storage section.

3. A speech recognition apparatus, comprising:

means for performing hidden Markov model learning from adaptation utterances of a new speaker stored in storage means in advance and speaker independent hidden Markov models;

means for calculating finite differences between parameters of learned hidden Markov models obtained as a result of the hidden Markov model learning and parameters of the speaker independent hidden Markov models;

means for storing the calculated finite differences as first finite differences;

a prediction parameter storage section for storing parameters of a prediction function determined in advance by prior learning;

prediction means for predicting second finite differences from linear sums of the first finite differences and the prediction parameters;

a specific speaker hidden Markov model storage section for storing specific person hidden Markov models of the new speaker; and addition means for adding the second finite differences and the parameters of the speaker independent hidden Markov models to calculate the parameters of the specific speaker hidden Markov models of the new speaker and outputting the parameters of the specific speaker hidden Markov models of the new speaker to said specific speaker hidden Markov model storage section.

4. A speech recognition apparatus as claimed in claim 3, wherein, in prior learning, the prediction parameters are learned using specific speaker hidden Markov models of a large number of speakers stored in said specific speaker hidden Markov model storage section and adaptation utterances of the speakers.

* * * * *